(12) United States Patent
Halferty et al.

(10) Patent No.: US 8,473,006 B1
(45) Date of Patent: Jun. 25, 2013

(54) METHOD AND APPARATUS FOR FREQUENCY MANAGEMENT

(75) Inventors: Clark D. Halferty, Lees Summit, MO (US); Andrew M. Wurtenberger, Olathe, KS (US); Ivy Y. Kelly, Overland Park, KS (US); Bryan T. Barbee, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 143 days.

(21) Appl. No.: 13/196,353

(22) Filed: Aug. 2, 2011

(51) Int. Cl.
*H04B 1/38* (2006.01)

(52) U.S. Cl.
USPC ........ 455/557; 455/509; 455/458; 455/435.1; 455/456.1; 455/404.2; 370/336; 370/312; 370/345; 370/342; 370/329

(58) Field of Classification Search
USPC .................. 455/557, 458, 456.1, 404.2, 411, 455/435.1; 370/336, 345, 329, 337, 342, 370/312

See application file for complete search history.

(56) References Cited

U.S. PATENT DOCUMENTS 5,774,809 A 6/1998 Tuutijarvi et al.

*Primary Examiner* — Kiet Doan
*Assistant Examiner* — Michael T Vu

(57) ABSTRACT

Disclosed is a method and apparatus and system for managing frequency use in a system where multiple air interface protocols are in use. When a wireless communication device (WCD) is operating under a particular air interface protocol on a particular frequency channel, the WCD detects a threshold signal under another air interface protocol, and the WCD responsively transitions from operating under the particular air interface protocol on the particular frequency channel to operating under the particular air interface protocol on a different frequency channel. The method may thereby help to reduce likelihood of interference.

13 Claims, 5 Drawing Sheets

METHOD AND APPARATUS FOR FREQUENCY MANAGEMENT

BACKGROUND

In a typical wireless communication system, a radio access network (RAN) will include one or more base stations, access points, or the like, that radiate to define one or more wireless coverage areas such as cells and cell sectors in which suitably equipped wireless communication devices (WCDs) can operate. In practice, a RAN and its served WCDs will be arranged to communicate with each other according to an agreed air interface protocol that defines a mechanism for use of communication resources to support wireless exchange of voice, data, multimedia, and/or other content. Examples of such protocols include CDMA (e.g., 1xRTT or 1xEV-DO), WiMAX, LTE, IDEN, GSM, WIFI, HSPA, among others now known or later developed. Further, some WCDs may be structured with one or more radios to support communication according to multiple air interface protocols, in order to facilitate convenient use of one protocol or another as appropriate.

In general, the wireless frequency spectrum that is available to carry these air interface communications may be divided into a number of frequency bands, and particular communications may occur on specified frequency channels within these bands. By way of example, the frequency spectrum may be divided into profile frequency bands such as an 800 MHz (cellular) band, a 1.9 GHz (PCS) band, and a 2.5 GHz (BRS/EBS) band, and each band may then be divided into frequency channels, such as particular 1.25 MHz blocks or 5 MHz blocks, around the profile frequency. For instance, in a system operating in the 800 MHz band, air interface communications may occur on frequency channels defined near 800 MHz. Likewise, in a system operating in the 1.9 GHz band, air interface communications may occur on frequency channels defined near 1.9 GHz. And similarly, in a system operating in the 2.5 GHz band, air interface communications may occur on frequency channels defined near 2.5 GHz.

OVERVIEW

Optimally, communications under different air interface protocols will be segregated from each other in the frequency domain, with particular frequency channels being defined for use to carry communications according to one air interface protocol and other frequency channels being defined for use to carry communications according to other air interface protocols. Further, this segregation of one air interface protocol from another would ideally be sufficient to avoid having communications on one air interface protocol interfere with communications on another air interface protocol.

Given the scarcity of wireless spectrum, however, it is sometimes necessary to implement distinct air interface protocols on adjacent or otherwise nearby frequency channels, or perhaps even on the same frequency channels. In such an implementation, or for other reasons, when a WCD is operating under a particular air interface protocol, the WCD may experience interference from air interface communications on another air interface protocol. In a worst case, this interference may result in blocked or dropped communications, degraded communications, or other user-experience issues.

Disclosed herein is a method and corresponding apparatus and system, to help manage use of frequency resources in a scenario where two or more air interface protocols are in use and a WCD operating under one air interface protocol may experience interference from communications occurring under another air interface protocol.

According to the method, while a WCD is operating under a first air interface protocol on a first frequency channel, the WCD will detect a threshold signal under a second air interface protocol. In response, the WCD will then transition from operating under the first air interface protocol on the first frequency channel to operating under the first air interface protocol on a second frequency channel. By transitioning from operating under the first air interface protocol on the first frequency channel to operating under the first air interface protocol on the second frequency channel, the WCD may thereby reduce the likelihood of interference.

This method may be carried out entirely by the WCD. By way of example, while the WCD is operating under the first air interface protocol on the first frequency channel, the WCD may from time to time scan for a signal under the second air interface protocol. Upon thereby detecting a sufficiently strong signal under the second air interface protocol, the WCD may then transition to operate under the first air interface protocol on the second frequency channel. For instance, the WCD may select the second frequency channel, such as one designated in a channel list message or otherwise known to be available for the first air interface protocol, and the WCD may register with the RAN for operation under the first air interface protocol on that second frequency channel.

Alternatively, the method may be carried out by the WCD with assistance or direction from the RAN. For example, while the WCD is operating under the first air interface protocol on the first frequency channel, the WCD may from time to time scan for a signal under the second air interface protocol. Upon thereby detecting a sufficiently strong signal under the second air interface protocol, the WCD may then transmit a notification to the RAN, the RAN may respond to the notification by instructing the WCD to search for coverage on the second frequency channel, and the WCD may thereby detect coverage on the second frequency channel and report the coverage to the RAN. In turn, the RAN may then direct the WCD to hand off to the second frequency channel, and the WCD may do so, thus transitioning from operating under the first air interface protocol on the first frequency channel to operating under the first air interface protocol on the second frequency channel.

These as well as other aspects, advantages, and alternatives will become apparent to those of ordinary skill in the art by reading the following detailed description, with reference where appropriate to the accompanying drawings. Further, it should be understood that the disclosure provided by this overview and the other description throughout this document is intended to illustrate the invention by way of example only and that numerous variations may be possible.

DETAILED DESCRIPTION

Figure 1:
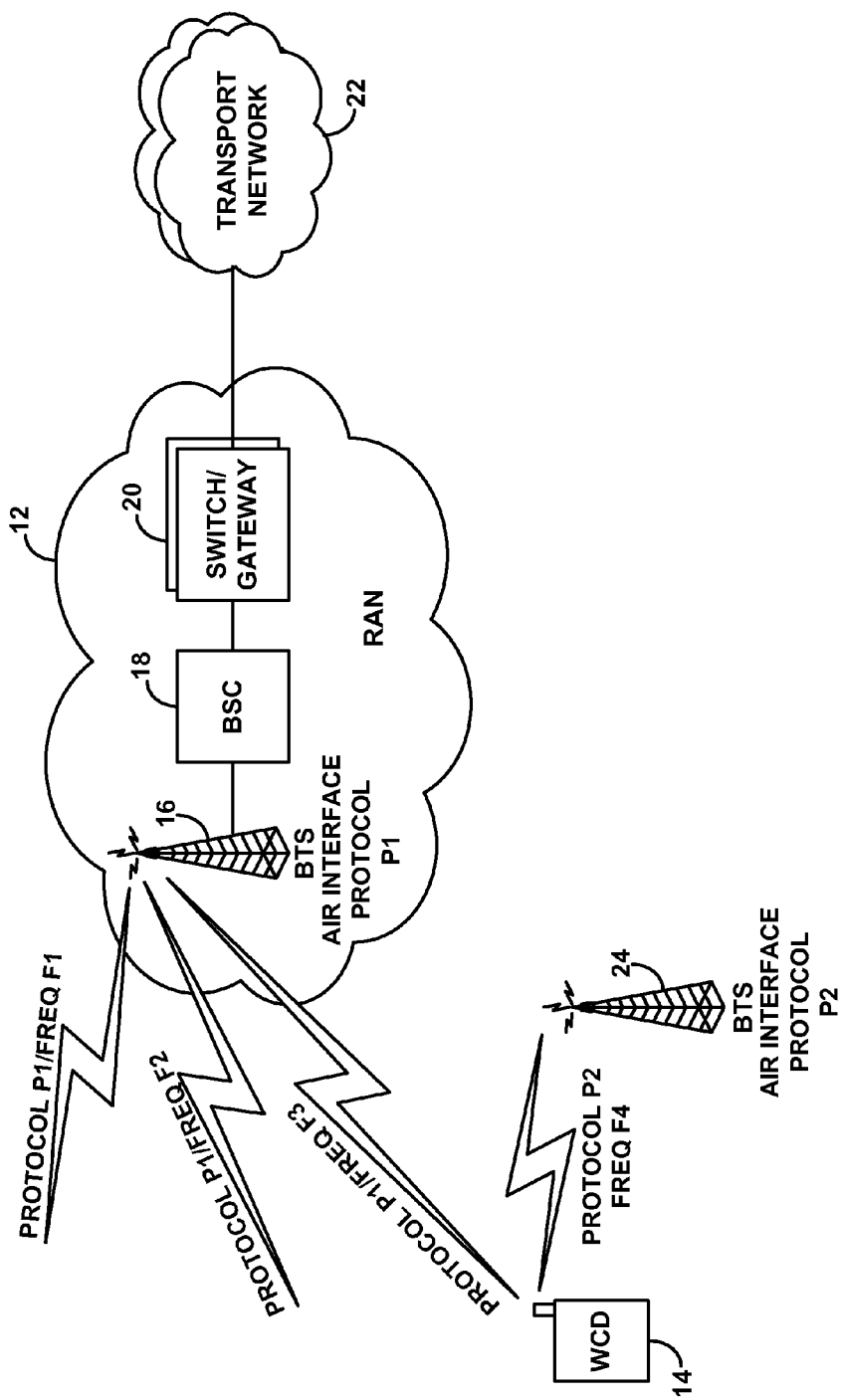
FIG. 1 is a simplified block diagram of a system in which the present method can be implemented.

Referring to the drawings, as noted above, FIG. 1 is a simplified block diagram of an example arrangement in which the present method can be implemented. As shown in FIG. 1, the example arrangement includes a representative RAN 12 and a representative WCD 14, both of which are configured to wirelessly communicate with each other according to an agreed air interface protocol P1, such as one of the protocols noted above for instance.

Representative RAN 12 is shown including a base transceiver station (BTS) 16, a base station controller (BSC) 18, and a switch (e.g., mobile switching center) and/or gateway (e.g., packet data serving node) 20 that provides connectivity with one or more transport networks 22 such as the public switched telephone network (PSTN) or the Internet. It should be understood, however, that the RAN could just as well take a variety of other forms, the specific details of which are not critical to an understanding of the present method. For instance, the RAN could just as well consist of a simple wireless access point or other device, regardless of whether the RAN provides connectivity with a transport network.

With the example arrangement shown, BTS 16 would typically include one or more antennas, power amplifiers, and associated equipment, cooperatively enabling the BTS to radiate in a manner that defines one or more wireless coverage areas such as a cell and cell sectors for instance. In practice, the BTS may be configured to provide service in each of its coverage areas on one or more defined frequency channels. As shown in FIG. 1, by way of example, the BTS may operate on frequency channels F1, F2, and F3.

By engineering design, these frequency channels may be defined in a common frequency band, such as one of the bands noted above for instance, and may take various forms. By way of example, each frequency channel may be a particular 1.25 MHz or 5 MHz block of frequency in the band, or may be a pair of frequency blocks, one for "forward link" communications from the BTS to WCDs and one for "reverse link" communications from WCDs to the BTS. Other arrangements are possible as well.

Furthermore, BTS 16 may be configured to implement a particular air interface protocol in each of its coverage areas, on each of its frequency channels. As shown in FIG. 1 and as noted above, for instance, the BTS may implement air interface protocol P1, which could be one of the air interface protocols noted above for example. Thus, in practice, the representative BTS would provide P1 coverage on frequency channel F1, on frequency channel F2, and on frequency channel F3.

On each frequency channel, the air interface protocol may define various sub-channels for carrying control and bearer data between the BTS and WCDs. The particular sub-channels may be protocol specific and may therefore take various forms. By way of example, on the forward link, the air interface protocol may define a pilot channel that serves to notify WCDs of the presence of the coverage area, a paging channel for carrying page messages to WCDs, other overhead channels for carrying system parameter information and the like, and a number of traffic channels for carrying bearer traffic (e.g., call traffic) to WCDs. The reverse link, on the other hand, may define an access channel for carrying registration messages, call initiation messages and the like, and a number of traffic channels for carrying bearer traffic to the RAN.

Each of these sub-channels may be defined in various ways, such as through code-division multiplexing, time-division multiplexing, or frequency division multiplexing for instance. In a CDMA system, for example, communications in a given coverage area are typically spread-spectrum modulated with a pseudo-noise offset (PN-offset) code associated with the coverage area, and various sub-channels such as the pilot channel, paging channel, and traffic channels are further spread spectrum modulated with a Walsh code specific to the sub-channel. In other systems, such as CDMA 1xEV-DO systems for instance, the various sub-channels may further be defined through time-division multiplexing on the frequency channel. And in still other systems, such as LTE for instance, the various sub-channels may be defined with orthogonal frequency division multiplexing on a plurality of closely spaced sub-carriers. Other examples are possible as well.

To facilitate communication with RAN 12, WCD 14 is equipped with a radio that can selectively tune to various frequency channels and that is arranged to operate in accordance with the agreed air interface protocol P1. In practice, when the WCD first powers on or otherwise does not have an assigned radio link traffic channel, the WCD may scan the airwaves in search of a pilot signal of sufficient strength (e.g., sufficient signal to noise ratio). Upon finding the pilot signal for a particular coverage are, the WCD may then transmit a registration message to the BTS to notify the RAN that the device is in the coverage area. The WCD may then operate in an "idle" mode, in which the WCD is not actively engaged in a call or other traffic communication but the WCD regularly monitors overhead signals in the coverage area to obtain system information and page messages for instance.

When the RAN seeks to connect a call or other communication to an idle WCD, the BTS may transmit a page message to the WCD in the coverage area where the WCD last registered. Upon detecting the page message, the WCD may then respond to the BTS, and the BTS may assign an air interface traffic channel (e.g., forward and reverse link traffic channels) to the WCD, thereby transitioning the device to an "active" state. Likewise, when the WCD seeks to initiate a call or other communication, the WCD and BTS may engage in signaling and the BTS may assign an air interface traffic channel to the WCD, thereby transitioning the WCD to the active state. Further, after a period of inactivity on the assigned air interface traffic channel, the traffic channel may be released, thereby transitioning the WCD back to an "idle" (e.g., dormant) state.

In practice, whether WCD 14 is idle or active, the WCD may regularly evaluate the strength of the pilot signal in its serving coverage area and the strength of pilot signals from neighboring coverage areas. If the WCD detects a pilot signal from another coverage area that is sufficiently stronger than that in its serving coverage area, the WCD may then engage in a handoff to the other coverage area. In the idle mode, for instance, the WCD may simply register with the RAN to notify the RAN that the WCD is now operating in the other coverage area. In the active mode, on the other hand, the WCD may engage in more substantial signaling with the RAN to facilitate handoff of the WCD's active communication session from its currently serving coverage are to the other coverage area.

In a scenario where a coverage area operates on multiple frequency channels, as in FIG. 1 for instance, an issue for both the WCD and the RAN is which frequency channel the WCD should operate on. To facilitate selection of a frequency channel, the BTS 16 may broadcast in each of its coverage areas a channel list message (CLM) that lists the frequency channels on which the BTS communicates in the coverage area, and the WCD 14 may be arranged to receive the CLM and to apply a predefined channel-selection process to select a frequency channel from those listed, and to then operate on the selected frequency channel. Further, the BTS may also be arranged to apply the same channel-selection process for the WCD so as to determine the frequency-channel to use for communicating with the WCD.

The predefined channel-selection process may be a hashing algorithm keyed to an identifier of the WCD, such as a device serial number or directory number, to help randomize distribution of WCDs among the available frequency channels. By way of example, the hashing algorithm may operate on the WCD identifier to produce an index value that points to a particular place in the CLM and therefore identifies which channel to use. For instance, given a CLM that lists frequency channels F1, F2, and F3, a hash result of 0 to 0.33 may point to channel F1, a hash result of 0.34 to 0.66 may point to channel F2, and a hash result of 0.67 to 1.0 may point to channel F3. As a simplified example, such an index value could be produced by taking one tenth of the last digit of the device's serial number, or taking one hundredth of the last two digits of the device's serial number. However, the details of the hashing algorithm are not critical. Further, other channel-selection processes could be applied as well.

In example implementation, one of the frequency channels in a multi-channel coverage area may be deemed a primary frequency channel on which the BTS will broadcast the CLM and WCDs will receive the CLM. (Alternatively, the CLM may be broadcast on each frequency channel in the coverage area.) Each WCD may be provisioned with logic, such as a preferred roaming list (PRL), that directs the WCD to the applicable primary channel when the subscriber device enters into such a coverage area. The WCD may then read the CLM broadcast on that channel and may apply the defined channel-selection process to select one of the frequency channels on which to operate. The CLM in this implementation may list both the primary channel and one or more secondary channels on which the BTS communicates in the coverage area. Thus, through application of a hashing algorithm or other channel-selection process, a subscriber device entering the coverage area can select one of the available channels on which to communicate with the RAN.

In the arrangement of FIG. 1, the assumption as shown is that WCD 14 is operating under air interface protocol P1 on frequency channel F3. Whether the WCD is idle or active, the WCD is considered to be served by the RAN in this arrangement.

FIG. 1 in turn depicts another BTS 24, which may be part of another RAN or may also be part of RAN 12. As shown, BTS 24 is arranged to implement an air interface protocol P2, which is different than air interface protocol P1. For example, air interface protocol P1 may be IDEN, LTE, or WiMAX, and air interface protocol P2 may be CDMA 1xEV-DO or GSM. As another example, air interface protocol P1 may be WiMAX and air interface protocol P2 may be LTE. Other examples are possible as well.

Figure 2:
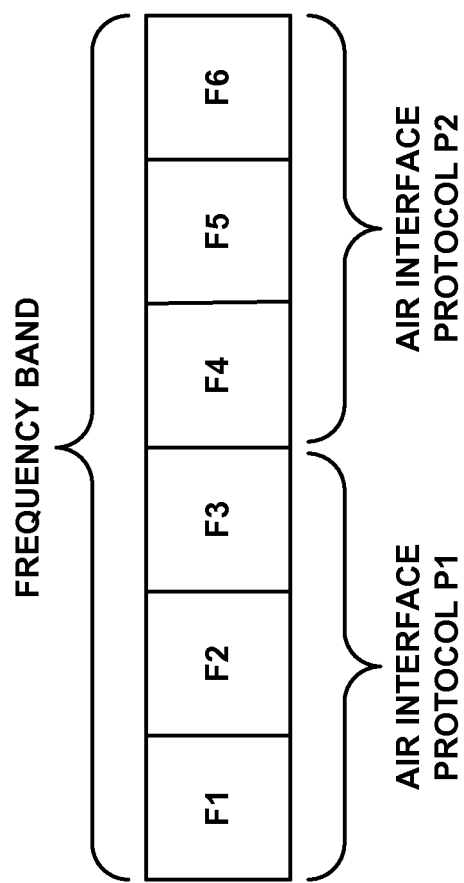
FIG. 2 is a depiction of a frequency band with adjacent frequency channels that may give rise to inter-protocol interference.

Optimally, BTS 24 will be configured to implement air interface protocol P2 on one or more frequency channels different than the frequency channels used by BTS 16 to implement air interface protocol P1. However, for one reason or another, one or more of the frequency channels that BTS 24 uses for air interface protocol P2 may be adjacent to or otherwise nearby one or more of the frequency channels that BTS 16 uses for air interface protocol P1. FIG. 2 illustrates such an arrangement, where BTS 24 would implement air interface protocol P2 on a frequency channel F4 that is adjacent to or nearby frequency channel F3 on which BTS 16 implements air interface protocol P1.

As shown in FIG. 2, a frequency band (such as one of those noted above for instance) is divided into a number of frequency channels, and some of those channels are allocated for use to support communications under air interface protocol P1, while others of the channels are allocated for use to support communications under air interface protocol P2. By way of example, as shown, frequency channels F1, F2, and F3 are allocated for use to support communications under air interface protocol P1, while frequency channels F4, F5, and F6 are allocated for use to support communications under air interface protocol P2.

Although FIG. 2 shows these frequency channels as being directly adjacent to each other, in actual practice there may be guard bands between adjacent channels, to help reduce the likelihood of interference. Furthermore, although FIG. 2 shows each frequency channel as being the same width, the frequency channels may vary in width.

In addition, although frequency channel F4 is shown entirely separate from frequency channel F3, in practice the two frequency channels may partially or fully overlap. This may occur, for instance, if frequency channel definitions for implementation of air interface protocol P2 differ in terms of channel width or other parameters from frequency channel definitions for implementation of air interface protocol P1, or for other reasons.

In any event, in the arrangement of FIG. 2, frequency channel F4 is at least adjacent to or nearby frequency channel F3. Consequently, when a WCD is operating on frequency channel F3, there is some chance that the WCD may experience interference from communications occurring on F4, even if the communications are occurring on a different air interface protocol.

In addition, the arrangement shown in FIG. 1 illustrates a particular scenario where WCD 14 has an increased risk of experiencing interference from communications on air interface protocol P2 while WCD 14 is operating under air interface protocol P1. The additional issue in FIG. 1 is that the WCD is relatively far away from its serving BTS 16 operating under air interface protocol P1 on frequency channel F3 and is relatively close to BTS 24 operating under air interface protocol P2 on nearby frequency channel F4. In this situation, the WCD may receive a relatively weak signal from BTS 16 and may be faced with a relatively strong signal from BTS 24. Consequently, the WCD may experience a fairly low signal-to-noise ratio in its serving coverage area, which could be problematic.

Figure 3:
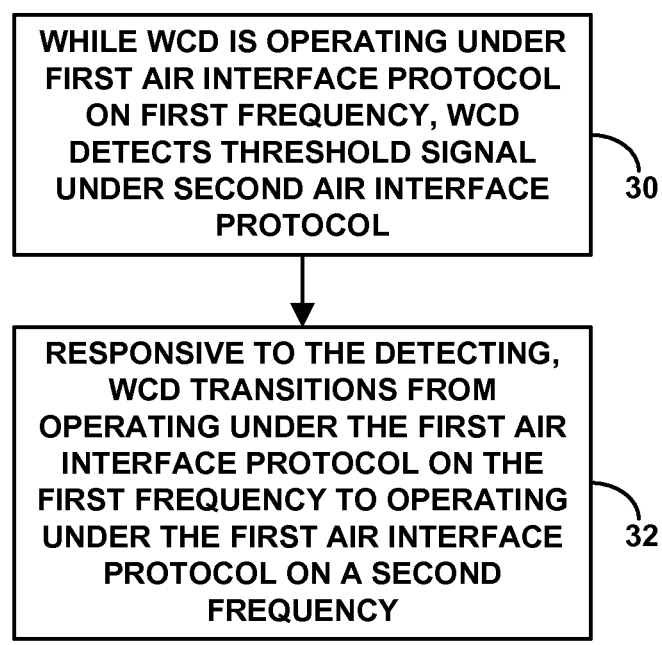
FIG. 3 is a flow chart depicting functions that can be carried out in accordance with the method.

FIG. 3 is a flow chart depicting functions that can be carried out in accordance with the present method to help address this or other situations. As shown in FIG. 3, at block 30, while a WCD is operating under a first air interface protocol on a first frequency, the WCD will detect a threshold signal under a second air interface protocol. At block 32, responsive to detecting the threshold signal under the second air interface protocol while operating under the first air interface protocol on the first frequency, the WCD will then transition from operating under the first air interface protocol on the first frequency to operating under the first air interface protocol on a second frequency.

In this process, the first frequency may be a first frequency channel, such as frequency channel F3 for instance. In practice, the WCD may have selected the first frequency through a channel-selection process as described above, or may be operating on the first frequency as a result of another process, such as the process described herein for instance. Further, the WCD may be operating under the first air interface protocol on the first frequency in an idle mode, an active mode, or some other mode.

The act of the WCD detecting the threshold signal under the second air interface protocol while operating under the first air interface protocol on the first frequency may then take various forms. By way of example, the WCD may be configured with two radios, one arranged to operate under the first air interface protocol, and the other arranged to operate under the second air interface protocol. While the WCD is operating under the first air interface protocol, the WCD may periodically or otherwise from time to time apply its other radio to scan the airwaves for a pilot signal or other communication under the second air interface protocol. As another example, if communications under the second air interface protocol are known to occur on a particular frequency channel or other type of channel, the WCD may from time to time scan that other channel for a pilot signal or other communication as a general matter, with the assumption being that any such communication would be a communication under the second air interface protocol.

Upon detecting such a signal, the WCD may then determine whether the signal meets a particular threshold in terms of its strength or other quality measure. In one embodiment, for instance, the threshold may be a signal strength measure without regard to the strength of signals that the WCD is receiving under the first air interface protocol on the first frequency. For instance, the WCD may be programmed by engineering design to apply a threshold of a particular dBm value that is deemed sufficiently high to constitute relevant interference. In another embodiment, the threshold may be a relative signal strength level compared with the strength of signals that the WCD is receiving under the first air interface protocol on the first frequency For instance, the WCD may be programmed to compute a ratio or difference between its first air interface protocol receive strength and its second air interface protocol receive strength, or vice versa, and to determine whether that ratio or difference meets a defined threshold sufficient to indicate relevant interference. Other implementations are possible as well.

The act of then responding to detecting the threshold signals under the second air interface protocol while operating under the first air interface protocol on the first frequency by transitioning from operating under the first air interface protocol on the first frequency to operating under the first air interface protocol on the second frequency may also take various forms.

By way of example, the WCD may autonomously select another frequency on which to operate under the first air interface protocol and may tune to that frequency and begin operation. The WCD may select the other frequency on which to operate by consulting a CLM broadcast by the RAN 12, possibly hashing onto a frequency after eliminating the current frequency from the list, or in some other way. In an idle mode, the WCD may transmit to the RAN a re-registration message to register on the new frequency in place of the old frequency, so that the RAN will be able to serve the WCD (with any page messages for instances) on the new frequency. In the active mode, on the other hand, the WCD may need to work more substantially with the RAN to orchestrate an inter-frequency handoff under the first air interface protocol.

As another example, the WCD may transmit to the RAN a notification of the perceived risk of interference. For instance, the WCD may transmit this notification as a newly defined reverse link air interface message, in a user-definable field under the first air interface protocol for instance. Alternatively or additionally, the WCD may transmit this notification within a radio environment report, such as a pilot strength management message (PSMM) for instance, indicating the level of the detected second air interface protocol signal possibly by comparison with the received first air interface protocol signal. In response to the notification, the RAN may then direct the WCD to transition from operating under the first air interface protocol on the first frequency to operating under the first air interface protocol on the second frequency.

The RAN may direct WCD to engage in this transition in various ways. By way of example, the RAN may simply transmit to the WCD a handoff directive, such as an extended handoff direction message (EHDM) that specifies the frequency on which the WCD is to operate, and the WCD may responsively tune to that frequency to continue operating under the first air interface protocol. As another example, the RAN may transmit to the WCD a frequency-search command, such as an CFSRQM (carrier frequency search request message) that specifies one or more frequencies on which the WCD is to scan for available coverage, including a specification of the second frequency. The WCD may then scan for coverage accordingly, in an effort to find a sufficiently strong pilot signal representing sufficiently strong coverage on one of the specified frequencies. Upon finding such coverage on the second frequency, the WCD may then send to the RAN a response message (e.g., a CFSRQM response message) reporting the found coverage. And the RAN may then transmit a handoff directive, such as an EHDM, to the WCD to direct the WCD to hand off to the second frequency for continued operation under the first air interface protocol.

In practice, if the WCD was operating in the idle mode under the first air interface protocol on the first frequency, then, upon making the transition, the WCD would likely continue to operate in the idle mode under the first air interface protocol on the second frequency. Similarly, if the WCD was operating in the active mode under the first air interface protocol on the first frequency, then, upon making the transition, the WCD would likely continue to operate in the active mode under the first air interface protocol on the second frequency.

Figure 4:
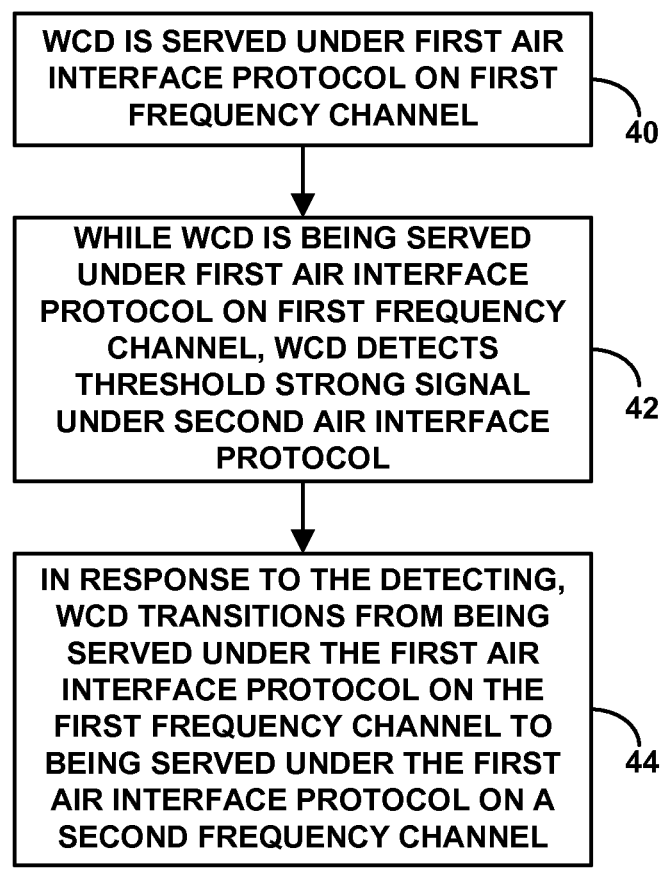
FIG. 4 is another flow chart depicting functions that can be carried out in accordance with the method.

FIG. 4 is next another flow chart depicting functions that can be carried out in accordance with the present method. As shown in FIG. 4, at block 40, the WCD is served under a first air interface protocol on a first frequency channel. At block 42, while the WCD is being served under the first air interface protocol on the first frequency channel, the WCD detects a threshold strong signal under a second air interface protocol. At block 44, in response to the WCD detecting the threshold strong signal under the second air interface protocol while the WCD is being served under the first air interface protocol on the first frequency channel, the WCD then transitions from being served under the first air interface protocol on the first frequency channel to being served under the first air interface protocol on a second frequency channel. The functions of this method can be implemented in much the same way the functions depicted in FIG. 3 could be implemented, as discussed above.

As noted above, it is possible that the WCD may detect the threshold strong signal under the second air interface protocol on the first frequency channel, i.e., on the same frequency channel that the WCD is using for communication under the first air interface protocol. This may happen, for instance, in a scenario where both protocols are implemented on the same frequency channel or sufficiently overlapping frequency channel. Alternatively, the second air interface protocol may be implemented on a third frequency channel that is other than the first frequency channel and other than the second frequency channel. Optimally, the second frequency channel would be more distant from the third frequency channel than the first frequency channel is from the third frequency channel, so that transitioning the WCD from the first frequency channel to the second frequency channel may more likely help to reduce possible interference from second air interface protocol communication on the third frequency channel.

Figure 5:
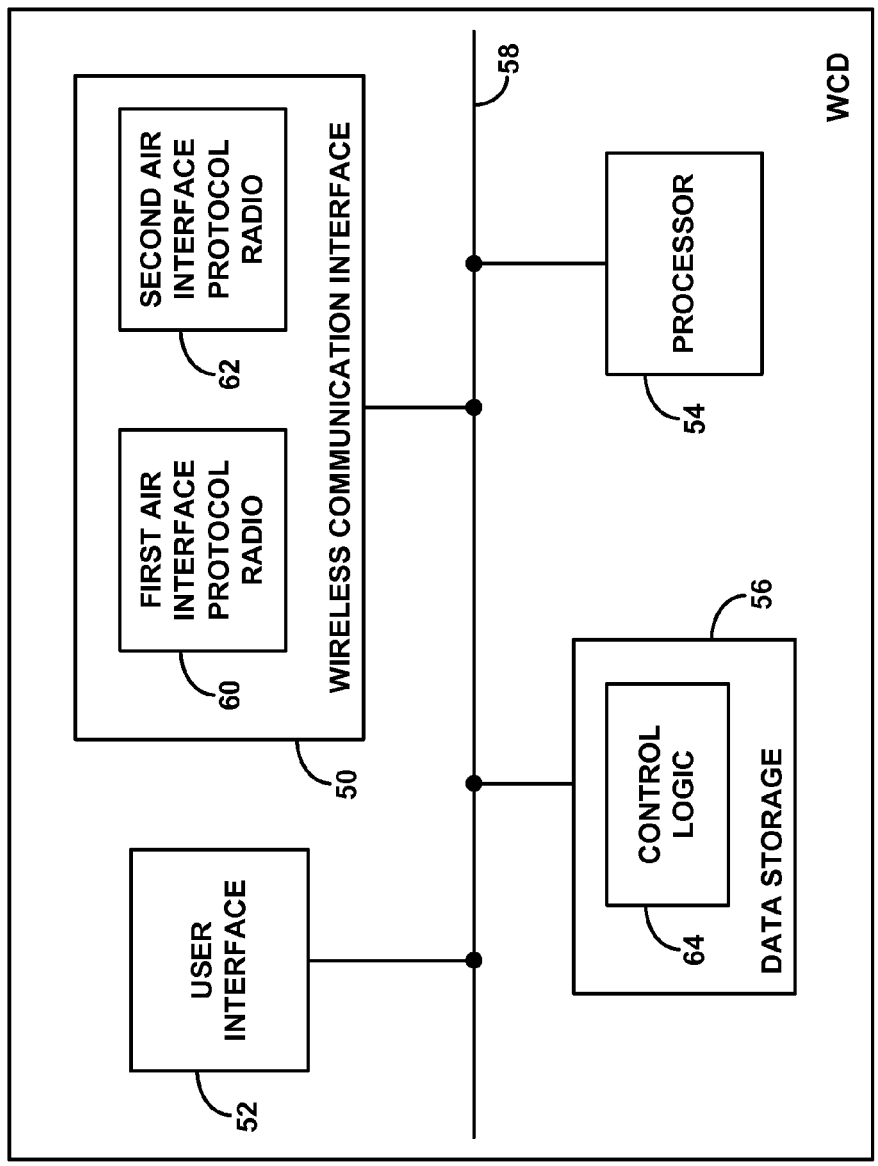
FIG. 5 is a simplified block diagram of a wireless communication device arranged to implement the method.

FIG. 5 is next a simplified block diagram showing functional components that can be included in the representative WCD 14 to facilitate implementation of the method. Example WCDs that may include these functional components include, without limitation, a cell phone, a wirelessly-equipped tablet, notebook, or other computer, a package tracking device, and a wireless communication module embedded in a vehicle, appliance, or other device. Numerous other examples are of course possible as well, and still others may be developed in the future.

As shown in FIG. 5, the representative WCD includes a wireless communication interface 50, a user interface 52, a processor 54, and data storage 56, all of which may be communicatively linked together by a system bus, network, or other connection mechanism 58.

Wireless communication interface 50 is shown by way of example including two radios 60, 62, one of which is configured to engage in communication under a first air interface protocol P1, and the other of which is configured to engage in communication under a second air interface protocol P2. In line with the discussion above, for instance, radio 60 may be an LTE or WiMAX radio, and radio 62 may be a CDMA radio. Or radio 60 may be a WiMAX radio, and radio 62 may be an LTE radio. Numerous other examples are possible as well. Further, although the figure shows these two radios as discrete blocks, in practice they may be integrated together. For instance, the radios may be provided as functions on a single chipset. Still further, although not shown expressly, each radio may include an associated antenna, or the radios may share a common antenna.

Radio 60 and/or radio 62 may include control logic arranged to carry out various WCD functions described herein. For instance, a radio chipset may itself include a processor and stored logic executable by the processor to carry out the described functions. Alternatively, a radio chipset may be otherwise configured as an application specific integrated circuit or the like to carry out the described functions.

User interface 52 in turn functions to receive input from a user and to provide output to a user, if the WCD is to be operated by an end-user. As such, the user interface may include input components such as a keypad, touchpad, touch-sensitive display, microphone, and camera, and the user interface may further include output components such as a display screen and a sound speaker or headset jack.

Processor 54 may include one or more general purpose processors and/or one or more special purpose processors (e.g., application specific integrated circuits or the like) and may be functionally integrated in whole or in part with wireless communication interface 50 or other WCD components. Data storage 56 may then include one or more volatile and/or non-volatile storage components, such as optical, magnetic, flash, or organic storage components, and may be integrated in whole or in part with processor 54. As shown, representative data storage 56 includes control logic 64 executable by processor 54 to carry out various WCD functions described herein, instead of or in addition to having a radio processor implement the control logic.

In practice, with this arrangement, when radio 60 is operating under a first air interface protocol on a first frequency, the control logic may make a determination that radio 62 is detecting a threshold strong signal under the second air interface protocol. For instance, radio 62 may receive a signal under the second air interface protocol and report the signal strength to the control logic, and the control logic may then determine that the signal strength is at least threshold high, alone or in relation to signal strength being received by radio 60 under the first air interface protocol. Response to that determination, the control logic may then cause radio 60 to transition from operating under the first air interface protocol on the first frequency to operating under the first air interface protocol on the second frequency. For instance, the control logic may send a control signal to radio 60 to cause the radio to change frequencies and perhaps to engage in signaling with a serving RAN to facilitate transitioning from operating under the first air interface protocol on the first frequency to operating under the first air interface protocol on the second frequency.

An exemplary embodiment has been described above. It should be understood, however, that variations from the embodiment discussed are possible, while remaining within the true spirit and scope of the invention as claimed.

We claim:

1. A method comprising:
   while a wireless communication device (WCD) is operating under a first air interface protocol on a first frequency, the WCD detecting a threshold signal under a second air interface protocol, wherein operating under the first air interface protocol on the first frequency comprises operating in an active mode under the first air interface protocol on the first frequency; and
   responsive to the detecting, the WCD transitioning from operating under the first air interface protocol on the first frequency to operating under the first air interface protocol on a second frequency, wherein operating under the first air interface protocol on the second frequency comprises operating in the active mode under the first air interface protocol on the second frequency,
   wherein the WCD is served by a radio access network (RAN) under the first air interface protocol, and
   wherein the WCD transitioning in response to the detecting comprises (i) in response to the detecting, the WCD providing a notification to the RAN, (ii) the WCD receiving from the RAN, in response to at least the notification, a directive for the WCD to transition to operate on the second frequency channel, and (iii) responsive to the directive, the WCD transitioning to operate on the second frequency channel.

2. The method of claim 1, wherein the WCD has a first radio for communicating under the first air interface protocol and the WCD has a second radio for communicating under the second air interface protocol, wherein operating under a first air interface protocol comprises using the first radio for communicating under the first air interface protocol, and wherein detecting the threshold strong signal under the second air interface protocol comprises using the second radio to scan under the second air interface protocol.

3. The method of claim 1, wherein transitioning responsive to the detecting comprises the WCD autonomously transitioning responsive to the detecting.

4. The method of claim 1, wherein receiving the RAN the directive responsive to the notification comprises:
   receiving from the RAN a frequency search command;
   responsive to the frequency search command, searching for and finding coverage under the first air interface protocol on the second frequency, and reporting the found coverage to the RAN;
   receiving the directive in response to the reporting.

5. A method for managing frequency use by a wireless communication device (WCD), the method comprising:
   the WCD being served under a first air interface protocol on a first frequency channel, wherein the WCD being served under the first air interface protocol on the first frequency channel comprises the WCD operating in an active mode under the first air interface protocol on the first frequency channel;

while the WCD is being served under the first air interface protocol on the first frequency channel, the WCD detecting a threshold strong signal under a second air interface protocol; and responsive to the WCD detecting the threshold strong signal under the second air interface protocol while the WCD is being served under the first air interface protocol on the first frequency channel, the WCD transitioning from being served under the first air interface protocol on the first frequency channel to being served under the first air interface protocol on a second frequency channel, wherein the WCD being served under the first air interface protocol on the second frequency channel comprises the WCD operating in the active mode under the first air interface protocol on the second frequency channel, wherein the WCD being served under the first air interface protocol on the first frequency channel comprises the WCD being served by a radio access network (RAN) under the first air interface protocol, and wherein the WCD transitioning in response to the detecting comprises (i) in response to the detecting, the WCD providing a notification to the RAN, (ii) the WCD receiving from the RAN, in response to at least the notification, a directive for the WCD to transition to operate on the second frequency channel, and (iii) responsive to the directive, the WCD transitioning to operate on the second frequency channel.

6. The method of claim 5, wherein detecting the threshold strong signal under the second air interface protocol comprises detecting the threshold strong signal under the second air interface protocol on the first frequency channel.

7. The method of claim 5, wherein the second air interface protocol operates on a third frequency channel, and wherein detecting the threshold strong signal under the second air interface protocol comprises detecting threshold strong power on the third frequency channel.

8. The method of claim 5, wherein the WCD has a first radio for communicating under the first air interface protocol and the WCD has a second radio for communicating under the second air interface protocol, and wherein detecting the threshold strong signal under the second air interface protocol comprises using the second radio to scan for a signal under the second air interface protocol.

9. The method of claim 5, wherein the first air interface protocol is Long Term Evolution (LTE) and the second air interface protocol is Code Division Multiple Access (CDMA).

10. The method of claim 5, wherein receiving the directive in response to at least the notification comprises:
receiving from the RAN, in response to the notification, a frequency-search command;
responsive to the frequency-search command, (i) scanning for and finding coverage on the second frequency channel, and (ii) reporting the found coverage to the RAN; and
receiving from the RAN, as the directive, a command to transition to operate on the second frequency channel.

11. The method of claim 5, wherein the notification comprises a radio environment report that indicates threshold low signal-to-noise ratio detected on the first frequency channel.

12. The method of claim 5, wherein the directive comprises an Extended Handoff Direction Message.

13. A wireless communication device (WCD) comprising:
a first radio for operating under a first air interface protocol;
a second radio for operating under a second air interface protocol; and
control logic operable, when the first radio is operating under the first air interface protocol on a first frequency, to make a determination that the second radio is detecting a threshold strong signal under the second air interface protocol, and responsive to the determination to cause the first radio to transition from operating under the first air interface protocol on the first frequency to operating under the first air interface protocol on a second frequency,
wherein operating under the first air interface protocol on the first frequency comprises operating under the first air interface protocol on the first frequency while the WCD is in an active mode, and operating under the first air interface protocol on the second frequency comprises operating under the first air interface protocol on the second frequency while the WCD is in the active mode,
wherein the WCD is served by a radio access network (RAN) under the first air interface protocol, and
wherein to cause the first radio to transition from operating under the first air interface protocol on the first frequency to operating under the first air interface protocol on the second frequency, the control logic is operable to (i) provide a notification to the RAN, (ii) receive from the RAN, in response to at least the notification, a directive for the first radio to transition to operate on the second frequency channel, and (iii) responsive to the directive, cause the first radio to transition to operate on the second frequency channel.

* * * * *